United States Patent
Miuchi et al.

(10) Patent No.: US 11,116,245 B2
(45) Date of Patent: Sep. 14, 2021

(54) METHOD FOR PREVENTING CAROTENOID PIGMENT FROM ADHERING TO CONTAINER

(75) Inventors: Takeshi Miuchi, Toyonaka (JP); Masayuki Nishino, Toyonaka (JP)

(73) Assignee: SAN-EI GEN F.F.I., INC., Toyonaka (JP)

(*) Notice: Subject to any disclaimer, the term of this patent is extended or adjusted under 35 U.S.C. 154(b) by 0 days.

(21) Appl. No.: 13/702,781

(22) PCT Filed: Jun. 8, 2011

(86) PCT No.: PCT/JP2011/063159
§ 371 (c)(1),
(2), (4) Date: Dec. 7, 2012

(87) PCT Pub. No.: WO2011/155535
PCT Pub. Date: Dec. 15, 2011

(65) Prior Publication Data
US 2013/0115345 A1    May 9, 2013

(30) Foreign Application Priority Data

Jun. 8, 2010 (JP) .............................. JP2010-130740

(51) Int. Cl.
| | | |
|---|---|---|
| *A23L 29/10* | (2016.01) | |
| *A23L 2/58* | (2006.01) | |
| *A23L 2/52* | (2006.01) | |
| *A23L 5/44* | (2016.01) | |
| *A23L 29/25* | (2016.01) | |

(52) U.S. Cl.
CPC ................ *A23L 29/10* (2016.08); *A23L 2/52* (2013.01); *A23L 2/58* (2013.01); *A23L 5/44* (2016.08); *A23L 29/25* (2016.08)

(58) Field of Classification Search
CPC .......... A23L 1/035; A23L 2/58; A23L 1/2753; A23L 1/053
See application file for complete search history.

(56) References Cited

U.S. PATENT DOCUMENTS

| 6,093,348 A | 7/2000 | Kowalski |
| 6,261,622 B1 * | 7/2001 | Koguchi ................... A23L 2/58 |
| | | 426/540 |

(Continued)

FOREIGN PATENT DOCUMENTS

| JP | H7-90188 | 4/1995 |
| JP | H7-123934 | 5/1995 |

(Continued)

OTHER PUBLICATIONS

Suzuki et al. JP 2008-182930 Japanese Machine Translation from AIPN pp. 1-17.*
Miuchi et al. JP 2009263638 Derwent Abstract 4 pages.*
R. Maruyama, et al.; "Transparent-type Emulsified Flavors Using Gum Ghatti;" FFI Journal; vol. 214; No. 4; 2009; pp. 516-518 (3 Sheets) and translation (9 Sheets)/Cited in International Search Report.
N. Inada, et al.; "Features of Emulsified Flavors and Their Use;" Food Industry; vol. 52; No. 20; Oct. 30, 2009; pp. 37-44(8 Sheets) and translation (18 Sheets)/Cited in International Search Report.

(Continued)

*Primary Examiner* — Felicia C Turner
(74) *Attorney, Agent, or Firm* — Kratz, Quintos & Hanson, LLP

(57) ABSTRACT

This invention relates to a method for preventing adhesion of a carotenoid pigment to manufacturing equipment or containers such as PET bottles during production of liquid foods such as beverages containing a carotenoid pigment. The method comprises adding gum ghatti to a system in which a carotenoid pigment is present.

9 Claims, 2 Drawing Sheets

(56) References Cited

U.S. PATENT DOCUMENTS

| | | | |
|---|---|---|---|
| 2002/0122851 A1* | 9/2002 | Bernitt et al. ............... 426/250 |
| 2010/0204523 A1* | 8/2010 | Tominaga ............... B65D 65/20 568/816 |
| 2011/0008502 A1 | 1/2011 | Hosomi | |
| 2011/0274809 A1* | 11/2011 | Miuchi ................... A23L 27/84 426/540 |

FOREIGN PATENT DOCUMENTS

| | | | |
|---|---|---|---|
| JP | H9-84566 | | 3/1997 |
| JP | H11-60980 | | 3/1999 |
| JP | 2004-267041 | A1 | 9/2004 |
| JP | 2009-219416 | A1 | 10/2009 |
| WO | 99/08549 | A1 | 2/1999 |
| WO | 2007/046333 | A1 | 4/2007 |
| WO | 2009/005107 | A1 | 1/2009 |
| WO | 2009/147158 | | 12/2009 |

OTHER PUBLICATIONS

T. Katayaya, et al.; "Characteristics of the Adsorbed Component of Gum Ghatti Responsible for Its Oil-Water Interface Advantages;" Foods & Food Ingredients J. Jpn.; vol. 213; No. 4; 2008; pp. 372-376 (5 Sheets)/Cited in International Search Report.

T. Ido, et al.; "Emulsification Properties of GATIFOLIA (Gum Ghatti) Used for Emulsions in Food Products;" FFI Journal; vol. 213; No. 4; 2008; pp. 365-671 (7 Sheets)Cited in International Search Report.

T. Ido; "Products—Gum Ghatti;" Foods & Food Ingredients J. Jpn.; vol. 211; No. 7; 2006; pp. 641-645 (5 Sheets) and translation (11 Sheets)/Cited in International Search Report.

International Search Report for International Application No. PCT/JP2011/063159 dated Aug. 2, 2011.

Office Action of corresponding Chinese Patent Application No. 201710092503.X dated Feb. 28, 2020 (11 sheets, 12 sheets translation, 23 sheets total).

* cited by examiner

METHOD FOR PREVENTING CAROTENOID PIGMENT FROM ADHERING TO CONTAINER

TECHNICAL FIELD

The present invention relates to a method for preventing adhesion of carotenoid pigments to containers.

BACKGROUND ART

Heretofore, carotenoid pigments have been used as a food colorant. Because carotenoid pigments are oil-soluble, they cannot be added directly to foods that contain a large amount of water-soluble material. Thus, a method for emulsifying the carotenoid pigments using surfactants, a method for incorporating the carotenoid pigments in foods as fine solids in a dispersion state, and the like have been developed.

However, since emulsified preparations are susceptible to heat or change in pH, the emulsion state is often disrupted, thereby causing separation of oils or color change. More specifically, in the preparation of a beverage using an emulsified carotenoid pigment, the emulsion is often disrupted during heat sterilization or hot-filling in the manufacturing process, or during heating of the filled beverages (hot beverages), thereby causing the oil-soluble carotenoid pigment to elute into the beverage, as well as causing phase separation or precipitation. This results in a decrease in the value of the beverage product.

In view of such problems, improvements were made in regard to the step of adding carotenoid pigments. For example, a method for producing an emulsified preparation resistant to heat and change in pH, and a method for pulverizing a carotenoid pigment and adding it as fine particles instead of as an emulsified preparation, thereby dispersing the carotenoid pigment in the beverage, have been developed.

Specifically, Patent Documents 1 and 2 disclose beverages colored with a red colorant (Patent Document 1) and an orange-red colorant (Patent Document 2) produced either by finely pulverizing an oil-soluble carotenoid-based pigment, and then dispersing the resulting particles in an aqueous material; or dispersing the carotenoid-based pigment in an aqueous material, and then finely pulverizing it.

In order to disperse carotenoid pigments, both of these methods use emulsifiers, thickening agents, food materials capable of improving emulsion stability, and the like. For example, emulsifiers or activating agents such as sucrose fatty acid ester, glycerin fatty acid ester, lecithin, or soybean saponin; thickening agents such as gum arabic, guar gum or xanthane gum; and food materials capable of improving emulsion stability such as starches including dextrin and modified starch, proteins including casein and gelatin, or soybean dietary fibers, are used in these methods.

Further, in addition to beverages containing carotenoid pigments, various liquid foods including various beverages have been suggested in which fruit juice, fruit vesicles, finely crushed jelly, microgels, or the like are evenly dispersed. Undesired precipitation or phase separation of the ingredients also often occurs in these liquid food products. Thus, various surfactants, emulsifiers, and gelling agents are added to these liquid foods so that the solid components, are dispersed and pulverized in a solvent.

For example, Patent Document 3 discloses a method for adding 0.001 to 0.5 weight % of agar to a liquid food containing insoluble solids; Patent Document 4 discloses a water-dispersible carotenoid pigment preparation containing a carotenoid pigment and a dispersion stabilizer that contains soybean extract fiber as an active substance; and Patent Document 5 discloses a fine solid dispersion preparation containing propyleneglycol and gum arabic.

CITATION LIST

Patent Documents

Patent Document 1: Japanese Unexamined Patent Publication No. 7-90188
Patent Document 2: Japanese Unexamined Patent Publication No. 9-84566
Patent Document 3: Japanese Unexamined Patent Publication No. 7-123934
Patent Document 4: Japanese Unexamined Patent Publication No. 11-60980
Patent Document 5: Japanese Unexamined Patent Publication No. 2004-267041

SUMMARY OF INVENTION

Technical Problem

During the production in the past of liquid foods containing carotenoid pigments, the adhesion of carotenoid pigments to tanks or pipes in manufacturing equipment has been problematic. Similarly, the adhesion of carotenoid pigments to empty PET bottles or the like of commercially available beverages after the consumers finish drinking the beverage has also been problematic. The adhesion of carotenoid pigments to manufacturing equipment is industrially undesirable, considering the effort required for cleaning. In addition, the adhesion of carotenoid pigments to PET bottles is undesirable in terms of exterior appearance and the reduction in intake of carotenoid pigments.

An object of the present invention is to provide a method for preventing adhesion of carotenoid pigments in liquids to containers.

Solution to Problem

The inventors of the present invention conducted extensive research regarding dispersion stability of carotenoid pigments, and, unexpectedly, found that the adhesion of carotenoid pigments to containers can be significantly reduced by using gum ghatti as a dispersion stabilizer for carotenoid pigments.

The present invention was completed based on this finding, and relates to the following methods for preventing adhesion of carotenoid pigments to containers.

Item 1:
A method for preventing adhesion of a carotenoid pigment in a liquid product to a container thereof, the method comprising adding gum ghatti to the system in which a carotenoid pigment is present.

Item 2:
The method for preventing adhesion of a carotenoid pigment to a container thereof according to Item 1, wherein the carotenoid pigment is at least one of α-carotene, β-carotene, lycopene, astaxanthin, canthaxanthin, lutein, zeaxanthin, cryptoxanthin, fucoxanthin, capsanthin, capsorubin, apocarotenal, bixin, norbixin, and crocetin.

Item 3:
The method for preventing adhesion of a carotenoid pigment to a container thereof according to Item 1 or 2, wherein the amount of gum ghatti is 0.01 to 100 parts by mass, per part by mass of the carotenoid pigment.

Item 4:

A carotenoid pigment-containing preparation comprising a carotenoid pigment and gum ghatti, wherein the carotenoid pigment-containing preparation is, in a liquid state, free from adhesion to a container.

Item 5:

The carotenoid pigment-containing preparation according to Item 4, wherein the carotenoid pigment is at least one of α-carotene, β-carotene, lycopene, astaxanthin, canthaxanthin, lutein, zeaxanthin, cryptoxanthin, fucoxanthin, capsanthin, capsorubin, apocarotenal, bixin, norbixin, and crocetin Item 6:

The carotenoid pigment-containing preparation according to Item 4 or 5, wherein the amount of gum ghatti is 0.01 to 100 parts by mass, per part by mass of the carotenoid pigment.

Item 7:

A carotenoid pigment-containing food comprising gum ghatti, wherein the carotenoid pigment-containing food is, in a liquid state, free from adhesion to a container.

Item 8:

The carotenoid pigment-containing food free from adhesion to a container, according to Item 7, wherein the carotenoid pigment is at least one of α-carotene, β-carotene, lycopene, astaxanthin, canthaxanthin, lutein, zeaxanthin, cryptoxanthin, fucoxanthin, capsanthin, capsorubin, apocarotenal, bixin, norbixin, and crocetin.

Item 9:

The carotenoid pigment-containing food free from adhesion to a container according to Item 7 or 8, wherein the amount of gum ghatti is 0.01 to 100 parts by mass, per part by mass of the carotenoid pigment.

Advantageous Effects of Invention

The method of the present invention prevents adhesion of carotenoid pigments to in liquid-food-manufacturing equipment such as tanks and pipes or beverage containers during the manufacturing step of adding a carotenoid pigment to a liquid food such as a beverage or liquid seasoning. More specifically, the present invention reduces the adhesion amount of carotenoid pigment to a container, for example, in a beverage containing a carotenoid pigment, thereby increasing the intake amount of carotenoid pigment. Moreover, because the present invention is also expected to provide an effect of preventing adhesion of carotenoid pigments in a beverage manufacturing line, the present invention increases the product yield while reducing the burden of equipment cleaning. Furthermore, in the step of filling a transparent container such as a PET bottle with a beverage, it is possible to prevent adhesion of carotenoid pigments to the inner wall of the container. Thus, the present invention also provides an effect of improving the product appearance.

DESCRIPTION OF EMBODIMENTS

The method for preventing adhesion of carotenoid pigments according to the present invention comprises adding gum ghatti to the system in which a carotenoid pigment is present.

Examples of carotenoid pigments used in the present invention include α-carotene, β-carotene, lycopene (tomato pigment), astaxanthin (haematococcus algae pigment), canthaxanthin, lutein (marigold pigment), zeaxanthin, cryptoxanthin, fucoxanthin, capsanthin (paprika pigment), capsorubin, apocarotenal, bixin, norbixin, and crocetin. The carotenoid pigments used in the present invention may be any of natural products, synthetic products, and semisynthetic products. The above examples of carotenoid pigments may be used solely or in a combination of two or more. The carotenoid pigment may be used with solid color components other than carotenoid pigments, such as carmine, curcumin, or the like.

The form of the carotenoid pigment used in the present invention is not particularly limited, and may be in the form of, for example, an emulsion obtained by usual procedure, or powder obtained by pulverizing a solid carotenoid pigment. The particle diameter of the pulverized carotenoid pigment is preferably about 0.01 to 2 μm.

The amount of the carotenoid pigment is appropriately adjusted depending on the target liquid food to be produced. The amount may also be adjusted according to the purpose of addition. Although it depends on the purity of the carotenoid pigment, when used to add colors to beverages, the amount of the carotenoid pigment is about 0.00001 to 1 part by mass, preferably about 0.0001 to 0.3 part by mass.

Gum ghatti used in the present invention contains, as a major component, a polysaccharide obtained by drying stem juice of Combretaceae *Anogeissus latifolia* Wall. Gum ghatti is a gum substance publicly known as a thickening agent (food additive). The gum ghatti used in the present invention is commercially available; examples thereof include gum ghatti RD of San-Ei Gen F.F.I., Inc.

In the present invention, the amount of gum ghatti may be appropriately adjusted depending on the concentration (or purity or the amount as a pure form) of a carotenoid pigment. For example, the amount of gum ghatti is preferably 0.01 to 100 parts by mass, more preferably 0.1 to 50 parts by mass, further preferably 5 to 30 parts by mass, per part by mass of a pure form of carotenoid pigment. When the amount of gum ghatti is 0.01 part by mass or less, the adhesion prevention effects becomes insufficient. The adhesion prevention effect of gum ghatti is sufficiently ensured when the amount thereof is 100 parts by mass; however, no further increase in effect is obtained by adding more gum ghatti.

Further, the amount of gum ghatti in the carotenoid pigment-containing preparations of the present invention is 1 to 50% by mass, preferably 1 to 35% by mass, more preferably 1 to 20% by mass, based on the entire preparation.

Addition of gum ghatti to the system in which the carotenoid pigment is present may be performed, for example, by a method of preparing a carotenoid pigment-containing preparation containing a carotenoid pigment and gum ghatti, and adding the resulting carotenoid pigment-containing preparation to a system in which the carotenoid pigment is present.

The preparation of the carotenoid pigment-containing preparation may be performed, for example, preferably by a method of dissolving gum ghatti in a solvent to prepare a gum ghatti solution, and mixing the resulting gum ghatti solution with the powdery carotenoid pigment. The solvent for dissolving gum ghatti is not particularly limited insofar as it is a solvent usable for living organisms (e.g., solvents for production of food, medicines, or cosmetics), and does not dissolve the carotenoid pigment; for example, water can be used as the solvent.

The form of the carotenoid pigment used in this method is also not particularly limited. For example, the carotenoid pigment may be an emulsified preparation obtained by usual dissolution steps, fine particles obtained by pulverizing a solid carotenoid pigment in a solution containing an aqueous solvent as a dispersion medium, or a liquid carotenoid pigment obtained by adding a previously pulverized carotenoid pigment to a dispersion medium. Examples of the dispersion media include water (ion-exchanged water), propyleneglycol, glycerin, and ethanol. These media may be used solely or in a combination of two or more. The pulverization of a solid carotenoid pigment may be performed using hitherto-known pulverizers or emulsifiers insofar, which are preferably capable of producing fine particles having a diameter of about 0.01 to 2 μm.

The system in which the carotenoid pigment is present is not particularly limited insofar as it contains the carotenoid pigment as a material, and has a liquid form (e.g., a liquid product such as an aqueous solution or a suspension) as a final product or during the manufacture (i.e., as an intermediate product). Examples thereof include various liquid foods, dietary supplements, medicinal products, quasi drugs, and cosmetics (colored cosmetics), each of which contains a carotenoid pigment as an ingredient (e.g., as a food additive or an additive agent).

Examples of liquid foods include beverages such as fruit-juice-containing beverages, vegetable-juice-containing beverages, or carbonated drinks; liquid seasonings such as liquid seasonings for Korean pickles, liquid seasonings for Japanese pickles, grilled meat sauce, liquid seasonings for processed meat such as ham or sausages, liquid seasonings for rice crackers; other foods including jelly, syrup, salted fish-guts, filling or dough of Chinese steamed buns; medicinal products such as liquid agents, syrup agents, or granular or powdery agents obtained by mixing liquids and processing the mixture into powder; and cosmetics such as lotions, creams, or emulsions. Of these, beverages and liquid seasonings are preferable.

Insofar as the effects of the present invention are ensured, commonly used additives may be used with a carotenoid pigment and gum ghatti according to the type of the target product. For example, for liquid foods, additives such as polysaccharide thickeners, flavors, colors, antioxidants, improvement agents for a long shelf-life, preservatives, sugars, as well as fruit juices or skins, finely crushed jelly, and microgels, may be used with a carotenoid pigment and gum ghatti. By using these additives, a variety of taste, flavor, and texture can be given to the liquid foods containing carotenoid pigments, thereby preparing liquid foods that meet a wide variety of preferences.

The method for adding gum ghatti to the system in which the carotenoid pigment is present can be performed by simply incorporating gum ghatti and a carotenoid pigment into a liquid food as ingredients during the manufacture. This method, which does not require any special devices or conditions, is industrially desirable.

The present invention suppresses adhesion of carotenoid pigments to manufacturing equipment, such as tanks or pipes during the manufacture of liquid foods such as beverages or liquid seasonings, thereby improving the yield and reducing the burden of equipment cleaning. Furthermore, after the beverage is contained in a container such as a PET bottle, the carotenoid pigment will not adhere to the inner wall of the container. Thus, the present invention provides beverages with improved appearances.

The objects of the method for preventing adhesion of carotenoid pigments, can include, in addition to containers of the final food or beverage products, all of the manufacturing equipment to be used for the manufacture of the aforementioned food or beverage products containing carotenoid pigments. More specifically, the objects include variety things such as mixing containers, tanks, pipes, mixing tanks, stirrers (propellers, etc.), measuring containers, sterilizing devices, and nozzles of filling devices. These objects may be made of any materials such as glass, stainless-steel, base steel, aluminum, or plastics (PET, PE, PP). The present invention is also effective to prevent carotenoid pigment adhesion to a paper drink box serving as a beverage container.

EXAMPLES

Hereinafter, the present invention is described in further detail with reference to Examples, Comparative Examples, etc. However, the scope of the invention is not limited to these Examples. In the formulations, the unit is "% by mass" unless otherwise specified.

The carotenoid pigment-containing preparations were prepared according to the formulations given below Examples 1 to 7. In the formulations, the gum ghatti used in the Examples; and the surfactant, gum arabic, modified starch, gelatin, and gellan gum used in the Comparative Examples are collectively referred to as "adhesion inhibitors." Details, such as addition amounts, are shown in Table 1.

Preparation of Carotenoid Pigment-Containing Preparation
Lycopene
Preparation Method 1

25 g of crystalline lycopene was added to 225 g of ethanol and mixed. The mixture was ground for two hours using a wet-type grinder (Dyno-Mill, manufactured by Willy A. Bachofen AG Maschinenfabrik) to produce a ground crystalline lycopene product.

Preparation Method 2

In accordance with Table 1 below, gum ghatti RD(manufactured by San-Ei Gen F.F.I., Inc.) was added to water, dissolved by heating to 90° C., and then cooled. A ground crystalline lycopene product was added thereto, and the resulting mixture was subjected to dispersion-homogenization at 350 kg/cm$^2$ using a high-pressure homogenizer to produce a carotenoid pigment-containing preparation. The particle size distribution of the carotenoid pigment-containing preparation was measured with a laser diffraction particle size analyzer (SALD-2100, manufactured by Shimadzu Corporation).

TABLE 1

|  | Example 1 | Example 2 | Example 3 | Example 4 | Example 5 | Example 6 | Example 7 |
| --- | --- | --- | --- | --- | --- | --- | --- |
| Ground crystalline lycopene product | 10 | 10 | 10 | 10 | 10 | 10 | 2 |
| Gum ghatti | 0.01 | 0.1 | 1 | 5 | 20 | 30 | 20 |
| Water | 89.99 | 89.9 | 89 | 85 | 70 | 60 | 78 |
| Average particle | 0.65 | 0.65 | 0.56 | 0.54 | 0.48 | 0.52 | 0.50 |

TABLE 1-continued

| | Example 1 | Example 2 | Example 3 | Example 4 | Example 5 | Example 6 | Example 7 |
|---|---|---|---|---|---|---|---|
| diameter(D50) (μm) | | | | | | | |
| Lycopene content (%) | 1% | 1% | 1% | 1% | 1% | 1% | 0.2% |

Comparative Example 1

Coloring preparation, "Lycopene Base No. 34824, manufactured by San-Ei Gen F.F.I., Inc." (a preparation obtained by dispersing crystalline lycopene using gum arabic; lycopene content: 1% by mass)

Comparative Example 2

Coloring preparation, "Lycopene Base No. 35153, manufactured by San-Ei Gen F.F.I., Inc." (a preparation obtained by dispersing crystalline lycopene using glycerine fatty acid ester; lycopene content: 2.5% by mass)

Comparative Example 3

100 g of the aforesaid ground crystalline lycopene product was added to a solution obtained by blending and dissolving 200 g of modified starch (Purity BE, manufactured by Nippon NSC Ltd.) in 700 g of water. The resulting mixture was subjected to dispersion-homogenization at 350 kg/cm² using a high-pressure homogenizer to produce the preparation of Comparative Example 3. The particle size distribution of the preparation of Comparative Example 3 was measured with a laser diffraction particle size analyzer (SALD-2100, manufactured by Shimadzu Corporation), and a result of 0.50 μm was found. The lycopene content was 1% by mass.

Comparative Example 4

50 g of the aforesaid ground crystalline lycopene product was added to a solution obtained by blending and dissolving 50 g of gelatin (Gelatin F-3578, manufactured by Jellice Co., Ltd.) in 900 g of water. The resulting mixture was subjected to dispersion-homogenization at 350 kg/cm² using a high-pressure homogenizer to produce the preparation of Comparative Example 4. The particle size distribution of the preparation of Comparative Example 4 was measured with a laser diffraction particle size analyzer (SALD-2100, manufactured by Shimadzu Corporation), and a result of 0.55 μm was found. The lycopene content was 0.5% by mass.

Comparative Example 5

10 g of the aforesaid ground crystalline lycopene product was added to a solution obtained by blending and dissolving 2 g of gellan gum (Kelcogel LT-100, manufactured by CP Kelco ApS) in 988 g of water. The resulting mixture was subjected to dispersion-homogenization at 350 kg/cm² using a high-pressure homogenizer to produce the preparation of Comparative Example 5. The particle size distribution of the preparation of Comparative Example 5 was measured with a laser diffraction particle size analyzer (SALD-2100, manufactured by Shimadzu Corporation), and a result of 0.65 μm was found. The lycopene content was 0.1% by mass.

β-Carotene

Example 8

25 g of crystalline β-carotene was added to 225 g of propylene glycol and mixed. The mixture was ground for one hour using a wet-type grinder (Dyno-Mill, manufactured by Willy A. Bachofen AG Maschinenfabrik) to produce a ground crystalline carotene product. 150 g of gum ghatti RD (manufactured by San-Ei Gen F.F.I., Inc.) was added to 750 g of water, dissolved by heating to 90° C., and then cooled. 100 g of ground crystalline carotene product was added thereto, and the resulting mixture was subjected to dispersion-homogenization at 350 kg/cm² using a high-pressure homogenizer to produce the preparation of Example 8. The particle size distribution of the preparation of Example 8 was measured with a laser diffraction particle size analyzer (SALD-2100, manufactured by Shimadzu Corporation), and a result of 0.45 μm was found. The β-carotene content was 1% by mass.

Comparative Example 6

250 g of gum arabic was blended and dissolved in 740 of water. 10 g of crystalline β-carotene was added to the resulting solution and mixed. The mixture thus obtained was ground for one hour using a wet-type grinder (Dyno-Mill, manufactured by Willy A. Bachofen AG Maschinenfabrik) to produce the preparation of Comparative Example 6. The particle size distribution of the preparation of Comparative Example 6 was measured with a laser diffraction particle size analyzer (SALD-2100, manufactured by Shimadzu Corporation), and a result of 0.48 μm was found. The β-carotene content was 1% by mass.

Astaxanthin

Example 9

150 g of gum ghatti RD (manufactured by San-Ei Gen F.F.I., Inc.) was added to 700 g of water, dissolved by heating to 90° C., and then cooled. A mixture of 50 g of haematococcus algae pigment (astaxanthin content: 10% by mass) and 100 g of medium-chain triglyceride was added thereto, followed by mixing at 5000 rpm for five minutes using a stirrer. The resulting liquid was emulsified three times at 350 kg/cm² using a high-pressure homogenizer to produce an emulsified composition (Example 9). The particle size distribution of the preparation of Example 9 was measured with a laser diffraction particle size analyzer (Microtrac MT-3000II, manufactured by Microtrac Inc.), and a result of 0.55 μm was found. The astaxanthin content was 0.5% by mass.

Comparative Example 7

200 g of gum arabic (SUPER GUM EM2, manufactured by San-Ei Gen F.F.I., Inc.) was added to 650 g of water, dissolved by heating to 90° C., and then cooled. A mixture of 50 g of haematococcus algae pigment (astaxanthin content: 10% by mass) and 100 g of medium-chain triglyceride was added thereto, followed by mixing at 5000 rpm for five minutes using a stirrer. The resulting liquid was emulsified three times at 350 kg/cm$^2$ using a high-pressure homogenizer to produce an emulsified composition (Comparative Example 7). The particle size distribution of the preparation of Comparative Example 7 was measured with a laser diffraction particle size analyzer (Microtrac MT-3000II, manufactured by Microtrac Inc.), and a result of 0.53 μm was found. The astaxanthin content was 0.5% by mass.

Comparative Example 8

150 g of decaglycerol oleic acid ester was added to 650 g of water, dissolved by heating to 90° C., and then cooled. A mixture of 50 g of haematococcus algae pigment (astaxanthin content: 10% by mass) and 100 g of medium-chain triglyceride was added thereto, followed by mixing at 5000 rpm for five minutes using a stirrer. The resulting liquid was emulsified three times at 350 kg/cm$^2$ using a high-pressure homogenizer to produce an emulsified composition (Comparative Example 8). The particle size distribution of the preparation of Comparative Example 8 was measured with a laser diffraction particle size analyzer (Microtrac MT-3000II, manufactured by Microtrac Inc.), and a result of 0.15 μm was found. The astaxanthin content was 0.5% by mass.

Preparation of Beverages

The carotenoid pigment-containing preparations obtained in Examples 1 to 9 and Comparative Examples 1 to 8 were diluted in such a manner that the carotenoid content became 0.1% by mass. Beverages formulated as below were prepared.

| Formulation | |
|---|---|
| High-fructose corn syrup (Brix 75) | 13.3 (g) |
| Citric acid (anhydride) | 0.2 |
| Trisodium citrate | 0.08 |
| Vitamin C | 0.02 |
| Carotenoid pigment-containing preparation | 1.15 |
| Ion exchange water | 85.25 |
| Total | 100 |

Citric acid (anhydride), trisodium citrate, and vitamin C were added to ion exchange water, followed by dissolution by stirring. High-fructose corn syrup and a carotenoid pigment-containing preparation were added to the solution. The resulting mixture was sterilized at 93° C., and then 500 g thereof was hot-filled into a 500 ml PET bottle.

Evaluation Method

Assuming the conditions under which actual beverages are manufactured and distributed in a market, the extent of adhesion of carotenoid pigment was measured by conducting the following tests under the conditions given below.

(1) shake test: prepared beverages were stood vertically, and shook at 140 strokes for 12 hours.

(2) transportation test: prepared beverages were transported by truck back and forth between Osaka and Tokyo.

(3) aeration: 2 L of beverage was filled in a 3 L stainless steel jug. After reaching 93° C., the temperature was lowered to 87° C., and air was flown at a flow rate of 1.8 L/min for one hour.

Measurement of Adhesion Amount

After each beverage that underwent the above tests was discharged from the containers, the containers were rinsed with 20 ml of water, and then dried at 60° C. The adhered carotenoid pigment was dissolved while adding hexane, dehydrated by adding sodium sulfate, subjected to cotton plug filtration, and condensed in an evaporator.

Measurement of Lycopene

The resulting condensed products were diluted with hexane to 10 ml total. Using hexane as a reference, the absorbance of the liquid at the maximum absorption wavelength near 470 nm was measured. The adhesion amount of lycopene was calculated by the formula below (absorption coefficient of lycopene (1%, 1 cm)=3450). Table 2 shows the results.

Lycopene adhesion amount (μg/jug)=(absorbance $A$×104×amount of hexane added for dilution (ml)/3450)

Measurement of β-Carotene

The resulting condensed products were diluted with cyclohexane to 10 ml total. Using cyclohexane as a reference, the absorbance of the liquid at the maximum absorption wavelength near 450 nm was measured. The adhesion amount of β-carotene was calculated by the formula below (absorption coefficient of β-carotene (1%, 1 cm)=2500). Table 2 shows the results.

β-carotene adhesion amount (μg/jug)=(absorbance $A$×104×amount of cyclohexane added for dilution (ml)/2500)

Measurement of Astaxanthin

The resulting condensed products were diluted with acetone to 10 ml total. The absorbance of the liquid at the maximum absorption wavelength near 478 nm was measured. The adhesion amount of astaxanthin was calculated by the formula below (absorption coefficient of astaxanthin (1%, 1 cm)=2100). Table 2 shows the results.

Astaxanthin adhesion amount (μg/jug)=(absorbance $A$×104×amount of astaxanthin added for dilution (ml)/2100)

TABLE 2

| | Pigment | Adhesion inhibitor | Shake test (1) Adhesion amount (μg/jug) | Transportation test (2) Adhesion amount (μg/jug) | Aeration test (3) Adhesion amount (μg/2 L) |
|---|---|---|---|---|---|
| Example 1 | Lycopene 1% | Ghatti gum 0.01% | 7 | 5.2 | 75 |
| Example 2 | Lycopene 1% | Ghatti gum 0.1% | 3 | 1.6 | 36 |
| Example 3 | Lycopene 1% | Ghatti gum 1% | 1.2 | 1.1 | 18.7 |
| Example 4 | Lycopene 1% | Ghatti gum 5% | 0.6 | 0.4 | 12 |

TABLE 2-continued

| | Pigment | Adhesion inhibitor | Shake test (1) Adhesion amount (μg/jug) | Transportation test (2) Adhesion amount (μg/jug) | Aeration test (3) Adhesion amount (μg/2 L) |
|---|---|---|---|---|---|
| Example 5 | Lycopene 1% | Ghatti gum 20% | 0.5 | 0.3 | 9.1 |
| Example 6 | Lycopene 1% | Ghatti gum 30% | 0.7 | 0.6 | 7.1 |
| Example 7 | Lycopene 0.2% | Ghatti gum 20% | 0.9 | 0.8 | 10.1 |
| Example 8 | β-carotene 1% | Ghatti gum 15% | 0.8 | 0.6 | 9.6 |
| Example 9 | Astaxanthin 0.5% | Ghatti gum 15% | 0.8 | 0.7 | 7.8 |
| Comparative Example 1 | Lycopene 1% | Gum arabic 27.5% | 16 | 7.3 | 167 |
| Comparative Example 2 | Lycopene 2.5% | Glycerine fatty acid ester 11% | 9.4 | 6.3 | 89.1 |
| Comparative Example 3 | Lycopene 1% | Modified starch 20% | 25.4 | 16.4 | 334 |
| Comparative Example 4 | Lycopene 0.5% | Gelatin 5% | 24.2 | 21.2 | 354 |
| Comparative Example 5 | Lycopene 0.1% | Gellan gum 2% | 20.3 | 19.9 | 280 |
| Comparative Example 6 | β-carotene 1% | Gum arabic 25% | 21.2 | 16.7 | 210 |
| Comparative Example 7 | Astaxanthin 0.5% | Gum arabic 20% | 14.1 | 14.3 | 121 |
| Comparative Example 8 | Astaxanthin 0.5% | Decaglycerol oleic acid ester 15% | 10.6 | 6.8 | 105 |

Results

Beverages were prepared according to the formulations and preparation methods described above. As shown in Table 2, the beverages that used gum ghatti as an adhesion inhibitor (Examples 1 to 4) exhibited noticeably lower adhesion amounts compared to Comparative Examples 1 to 8. It was also confirmed visually that carotenoid pigment did not adhere to the stainless steel jugs used at the time of preparation or to the PET bottles or stainless steel jugs into which the beverages were filled. However, beverages prepared using ordinary surfactants (Comparative Examples 2 and 8) and polysaccharides (Comparative Examples 1 and 3 to 7) resulted in adhesion to such an extent that adhesion was visually observed.

The surfactants used in Comparative Examples 2 and 8 (e.g., glycerine fatty acid ester) are widely used as emulsifiers for beverages and the like, and they are known to have excellent emulsifying power and emulsification stability. Similarly, the gum arabic, modified starch, gelatin and gellan gum used in Comparative Example 1 were used for the purpose of emulsification or thickening. They achieved no effects in terms of the objection of the present invention, i.e., preventing adhesion of a carotenoid pigment to containers. This indicates that there is no correlation between having excellent emulsifying power or emulsification stability, and exhibiting the effect of prevention of adhesion to container; and such an effect is not even suggested.

Container Filling Test

The carotenoid pigment-containing preparations obtained in Comparative Example 1 and Example 4 were diluted with water so that the concentration thereof became 10% by mass, and test liquids having the following formulation were prepared.

| | |
|---|---|
| High-fructose corn syrup | 13.3 (g) |
| Citric acid (anhydride) | 0.2 |
| Trisodium citrate | 0.08 |
| Vitamin C | 0.02 |
| 10% by mass carotenoid pigment-containing preparation | 1.15 |
| Ion exchange water | 85.25 |
| Total | 100 |

10 kg of each of the test liquids were prepared and sterilized at 120° C. for 30 seconds using a UHT sterilizer, followed by filling into a 2 L PET bottle, a 2 L stainless steel jug, a 1 L paper pack, and a 2 L beaker. After cooling to a temperature of 25° C. or less, the test liquids were discharged from the containers. Thereafter, the adhesion amounts of pigment were measured based on the adhesion amount measurement methods described above. Table 3 shows the results.

TABLE 3

| Sample | Type of container | Conditions | Adhesion amount (μg/2 L) |
|---|---|---|---|
| Comparative Example 1 | 2 L PET bottle | Adhesion of pigment is observed in the upper portion of PET bottle | 135.7 |
| Example 4 | 2 L PET bottle | Almost no adhesion of pigment is observed | 12.9 |
| Comparative Example 1 | 2 L stainless steel jug | Adhesion of pigment is observed in the upper portion of jug | 122.6 |
| Example 4 | 2 L stainless steel jug | Almost no adhesion of pigment is observed | 5.9 |
| Comparative | 1 L paper | Adhesion of pigment | 99.7 |

TABLE 3-continued

| Sample | Type of container | Conditions | Adhesion amount (μg/2 L) |
|---|---|---|---|
| Example 1 | pack | is observed in the upper portion of paper pack | |
| Example 4 | 1 L paper pack | Almost no adhesion of pigment is observed | 10.9 |
| Comparative Example 1 | 2 L beaker | Adhesion of pigment is observed in the upper portion of beaker | 96.2 |
| Example 4 | 2 L beaker | Almost no adhesion of pigment is observed | 3.5 |

Table 3 clarifies that the adhesion of pigment was remarkably reduced, without being affected by the material of the container, only in the case where the beverages of the present invention were filled. FIG. 1 shows a picture of a PET bottle in which the test liquid of Comparative Example 1 had been filled. FIG. 2 shows a picture of a PET bottle in which the test liquid of Example 4 had been filled.

Examples of the liquid foods of the present invention are described below; however, the scope of the present invention is not limited thereto.

Example 10

Preparation of Liquid Seasoning
Carotenoid Pigment-Containing Preparation

Preparation method: 300 g of paprika pigment (Paprika Oleoresin No. 44489, manufactured by San-Ei Gen F.F.I., Inc.) was mixed with a solution obtained by blending and dissolving 150 g of gum ghatti (Gum Ghatti RD, manufactured by San-Ei Gen F.F.I., Inc.) in 550 g of water. The resulting mixture was subjected to emulsification at 350 kg/cm$^2$ using a high-pressure homogenizer to produce a carotenoid pigment-containing preparation. The particle size distribution of the carotenoid pigment-containing preparation was measured with a laser diffraction particle size analyzer (Microtrac MT-3000II, manufactured by Microtrac Inc.), and a result of 0.85 μm was found. The color density was 30000 CV.

Comparative Example 9

Coloring preparation, "Paprika Base No. 34007, manufactured by San-Ei Gen F.F.I., Inc." (preparation obtained by emulsifying a paprika pigment with glycerine fatty acid ester: 30000 CV)

| Formulation of liquid seasoning: | |
|---|---|
| Dark soy sauce | 55 |
| Modified starch (Stabilose K, manufactured by Matsutani Chemical Industry Co., Ltd.) | 6 |
| Water | 38.3 |
| Carotenoid pigment-containing preparation | 0.7 |
| Total | 100 |

Dark soy sauce, water, and modified starch (Stabilose K) are heated to 90° C. After cooling the mixture to 60° C., a carotenoid pigment-containing preparation was added thereto. The resulting liquid seasoning was then filled into a 200 ml PET bottle.

After being allowed to stand for six hours, the liquid seasoning was discharged. The PET bottle was lightly rinsed with 50 ml of water, and the adhered pigment was collected with acetone. The color density was calculated based on absorbance A at the maximum absorption wavelength near 458 nm using acetone as reference.

Table 4 shows the results. FIG. 3 shows the PET bottles from which the liquid seasonings were discharged.

TABLE 4

| | Color density of liquid seasoning | Adhesion amount | Adhesion rate |
|---|---|---|---|
| Example 10 | 210 | 0.1 | 0.05% |
| Comparative Example 9 | 210 | 7.0 | 3.43% |

As is evident from the results shown in Table 4, the adhesion of paprika pigment in Example 10 was remarkably reduced. This is also clear from the picture of FIG. 3.

Example 11

Tare (sauce) for yakiniku (grilled meat) (hereunder referred to as grilled meat sauce)

| A: | Water | 62 |
|---|---|---|
| | Guar gum | 0.3 |
| B: | Dark soy sauce | 15 |
| | Cooking wine | 5 |
| | Ginger paste | 1 |
| | Garlic paste | 1.5 |
| | Tomato paste | 9 |
| | Onion extract | 3 |
| | Amino acid condiment | 2.5 |
| | Sucralose | 0.008 |
| | Carotenoid pigment-containing preparation (Example 10) | 0.05 |

Ingredients A were mixed and heated at 80° C. for 10 minutes. Then, all ingredients B were added, and the entire mixture was heated at 80° C. for 5 minutes. Thereafter, the entire mixture was made up to 100 parts with water. The mixture thus obtained was filled into a transparent glass bottle, and sterilized at 90° C. for 30 minutes to produce grilled meat sauce. The content was discharged, and the glass bottle was washed with water. As a result, the adhesion of pigment was reduced.

Example 12

| Liquid seasoning for kimchi (Korean pickles) | |
|---|---|
| Condiment (Amishin awakuchi, manufactured by Shin-Shin Foods Co., Ltd.) | 12 (g) |
| High-fructose corn syrup | 12 |
| Brewed vinegar (acidity 10%) | 2.8 |
| Red pepper powder (manufactured by K.I.S Co., Ltd.) | 2.2 |
| Sodium L-glutamate | 5.5 |
| Salt | 3.5 |
| Xanthan gum preparation (SAN ACE, manufactured by San-Ei Gen F.F.I., Inc.) | 0.3 |
| Carotenoid pigment-containing preparation (Example 10) | 0.6 |
| diluted with water to Total | 100 |

In a preliminary step, the dead outside leaves of a Chinese cabbage were removed. The remainder of the Chinese cabbage was cut into pieces about 1 cm in size, and washed with water. The pieces were cut in two, and soaked overnight in an aqueous solution of 6% by weight of salt. The above-mentioned liquid seasoning for kimchi was added thereto. The resultant was filled and sealed in a transparent plastic container, and pickled under cooling for 10 days. The plastic container was opened and the content was discharged, followed by washing with water. As a result, the adhesion of pigment was reduced.

Figure 1:
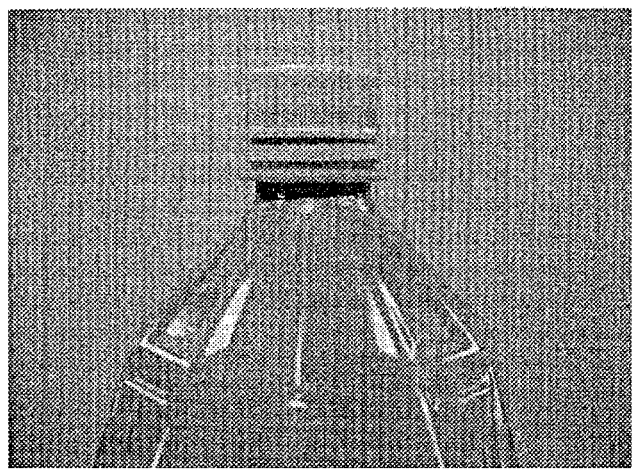
FIG. 1 shows a PET bottle into which the beverage of Comparative Example 1 was filled and the content was discharged.
Figure 2:
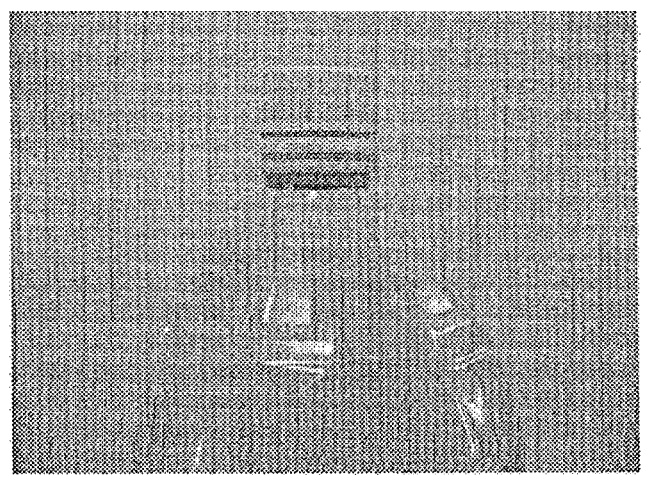
FIG. 2 shows a PET bottle into which the beverage of Example 4 was filled and the content was discharged.
Figure 3:
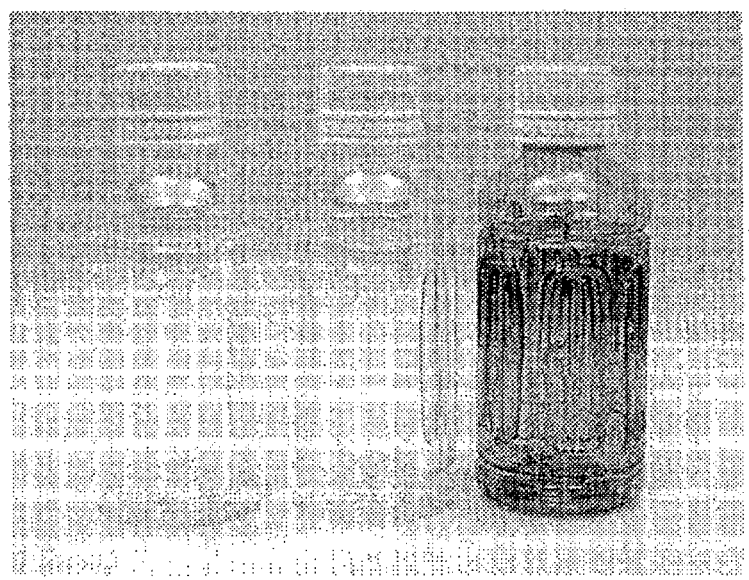
FIG. 3 shows, from the left, a blank container, a container into which the beverage of Example 10 had been filled, and a container into which the beverage of Comparative Example 9 had been filled.

The invention claimed is:

1. A method for preventing adhesion of a carotenoid pigment in a liquid product to a container thereof,
   the method comprising (A) or (B) below,
   (A) (1) grinding a crystalline carotenoid pigment with a dispersion medium selected from the group consisting of propylene glycol, glycerin, and ethanol by using wet grinder to obtain a wet ground crystalline carotenoid pigment, and,
   (2) mixing a gum ghatti solution with the wet ground crystalline carotenoid pigment,
   (B) grinding a crystalline carotenoid pigment with gum ghatti in the presence of a dispersion medium selected from the group consisting of water, propylene glycol, glycerin, and ethanol by using wet grinder to obtain a wet ground crystalline carotenoid pigment;
   wherein the wet ground crystalline carotenoid pigment and gum ghatti are contained in the liquid product;
   wherein the amount of the wet ground crystalline carotenoid pigment is 0.00001 to 1 part by mass of the liquid product; and
   wherein the amount of gum ghatti is 0.01 to 100 parts by mass per part by mass of the wet ground crystalline carotenoid pigment.

2. The method for preventing adhesion of a carotenoid pigment to a container thereof according to claim 1, wherein the carotenoid pigment is at least one of α-carotene, β-carotene, lycopene, astaxanthin, canthaxanthin, lutein, zeaxanthin, cryptoxanthin, fucoxanthin, capsanthin, capsorubin, apocarotenal, bixin, norbixin, and crocetin.

3. A dispersed-homogenized carotenoid pigment preparation comprising a wet ground crystalline carotenoid pigment and gum ghatti,
   wherein the carotenoid pigment preparation is in a liquid state,
   wherein the amount of the wet ground crystalline carotenoid pigment is 0.00001 to 1 part by mass of the liquid product,
   wherein the amount of gum ghatti is 0.01 to 100 parts by mass per part by mass of the wet ground crystalline carotenoid pigment.

4. The carotenoid pigment preparation according to claim 3, wherein the carotenoid pigment is at least one of α-carotene, β-carotene, lycopene, astaxanthin, canthaxanthin, lutein, zeaxanthin, cryptoxanthin, fucoxanthin, capsanthin, capsorubin, apocarotenal, bixin, norbixin, and crocetin.

5. A liquid product comprising the dispersed-homogenized carotenoid pigment preparation according to claim 3,
   wherein the liquid product is a composition selected from the group consisting of liquid foods, dietary supplements, medicinal products, quasi drugs and cosmetics.

6. The liquid product according to claim 5, wherein the carotenoid pigment is at least one of α-carotene, β-carotene, lycopene, astaxanthin, canthaxanthin, lutein, zeaxanthin, cryptoxanthin, fucoxanthin, capsanthin, capsorubin, apocarotenal, bixin, norbixin, and crocetin.

7. The method for preventing adhesion of a carotenoid pigment to a container thereof according to claim 1, wherein adhesion amounts of the carotenoid pigment to the container are lower when the combination of gum ghatti and the wet ground crystalline carotenoid pigment is used than when the combination of gum arabic and the wet ground crystalline carotenoid pigment is used.

8. The method for preventing adhesion of a carotenoid pigment to a container thereof according to claim 1,
   wherein the amount of the wet ground crystalline carotenoid pigment is 0.0001 to 0.3 part by mass of the liquid product.

9. The dispersed-homogenized carotenoid pigment preparation according to claim 3,
   wherein the amount of the wet ground crystalline carotenoid pigment is 0.0001 to 0.3 part by mass of the liquid product.

* * * * *